United States Patent
Gingrich et al.

[11] Patent Number: 6,074,459
[45] Date of Patent: Jun. 13, 2000

[54] ULTRA PURE GASES: REMOVAL OF HALOCARBONS, FLUOROCARBONS, AND SULFUR COMPOUNDS FROM GAS STREAMS

[75] Inventors: Jon S. Gingrich, Sacramento; James R. Lansbarkis, El Dorado, both of Calif.

[73] Assignee: UOP LLC, Des Plaines, Ill.

[21] Appl. No.: 09/225,528

[22] Filed: Jan. 4, 1999

Related U.S. Application Data

[60] Provisional application No. 60/070,383, Jan. 5, 1998.

[51] Int. Cl.[7] .............................. B01D 53/04; B01D 53/26
[52] U.S. Cl. .................................. 95/118; 95/135; 95/136; 95/142; 95/143; 96/132; 96/135
[58] Field of Search ............................... 95/117–119, 131, 95/132, 135–137, 142, 143; 96/132, 135, 154

[56] References Cited

U.S. PATENT DOCUMENTS

| | | | |
|---|---|---|---|
| 2,096,851 | 10/1937 | Fricke | 96/132 |
| 2,325,657 | 8/1943 | Burkness | 96/132 X |
| 3,164,453 | 1/1965 | Milton | 95/117 |
| 4,746,338 | 5/1988 | Williams | 96/132 X |
| 5,075,084 | 12/1991 | Wilhelm et al. | 95/142 X |
| 5,221,520 | 6/1993 | Cornwell | 95/142 X |
| 5,451,248 | 9/1995 | Sadkowski et al. | 95/144 X |
| 5,531,809 | 7/1996 | Golden et al. | 96/132 X |
| 5,536,301 | 7/1996 | Lansbarkis et al. | 95/117 |
| 5,858,068 | 1/1999 | Lansbarkis et al. | 95/137 X |
| 5,906,675 | 5/1999 | Jain et al. | 95/143 X |
| 5,914,455 | 6/1999 | Jain et al. | 95/143 X |
| 5,944,878 | 8/1999 | Lindhe | 96/132 |

FOREIGN PATENT DOCUMENTS

| | | | |
|---|---|---|---|
| 62-148304 | 7/1987 | Japan | 96/132 |
| 1068150 | 1/1984 | U.S.S.R. | 95/119 |

*Primary Examiner*—Robert H. Spitzer
*Attorney, Agent, or Firm*—John G. Toloemi; Frank S. Molinaro; Maryann Maas

[57] ABSTRACT

A process for removing sulfur-containing compounds and halocarbons such as fluorocarbons and chlorocarbons from gases to provide gas streams which contain these compounds at unprecedentedly low levels using an adsorption train of four beds has been developed. The first bed serves to remove water, the second and third beds remove sulfur-containing compounds generally, and the fourth adsorbent bed removes sulfur-containing compounds and halocarbons such as chlorocarbons and fluorocarbons to very low levels.

22 Claims, 1 Drawing Sheet

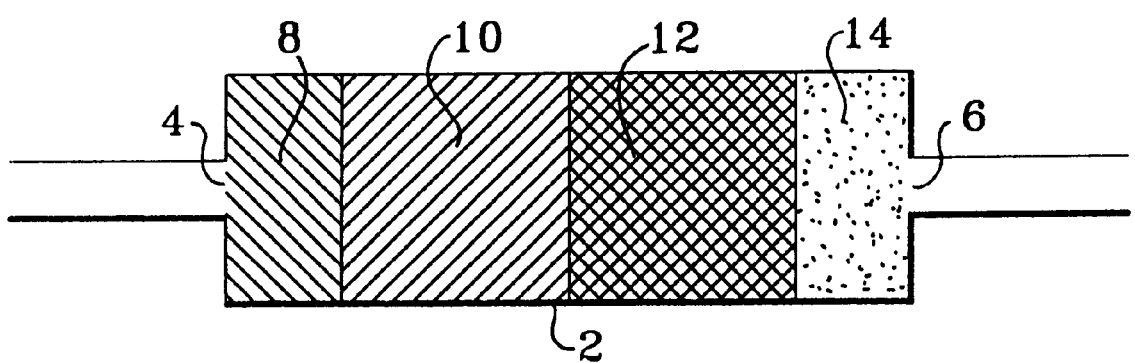

ULTRA PURE GASES: REMOVAL OF HALOCARBONS, FLUOROCARBONS, AND SULFUR COMPOUNDS FROM GAS STREAMS

CROSS REFERENCE TO RELATED APPLICATION

This application claims the benefit of priority of Provisional Application Ser. No. 60/070383, filed, Jan. 5,1998, all of which is hereby incorporated by reference.

BACKGROUND OF THE INVENTION

The purification of gases generally, including gases such as nitrogen, argon, helium, and carbon dioxide, has progressed to the point where gas purity of 99+% is routine, and 99.9+% is not uncommon. Yet, even as increasingly pure gases are made available, there are increased needs for ever purer gases; purity begets still higher levels of purity.

One area of need is the removal of sulfur-containing compounds from gases to residual levels measured in parts per billion and even lower. For example, catalyst systems employing nickel, platinum, palladium, and so forth are quite sensitive to sulfur levels, and processes employing such metals as catalysts or components of catalyst systems generally utilize a guard bed of a suitable adsorbent to remove the offending compounds. Analytical measurements also may depend upon the removal of sulfur compounds to unprecedentedly low levels for high precision and high accuracy in measurement. For example, in the case of sulfur chemiluminescence, the lower limits of instrumental detection are dependent upon the background sulfur levels in the gas supplied to the system. Removal of sulfur-containing species can dramatically improve detection levels and serves as an incentive for advanced purification methods.

We have developed a sequence of adsorbent beds employing several different adsorptive compounds to achieve a very efficient removal of sulfur-containing compounds, halocarbons, and fluorocarbons. The traditional method of removing sulfur has employed a high nickel content catalyst as a guard bed acting as a general adsorbent, including the function of nickel as a chemisorbent for sulfur-containing compounds. The multiple bed approach of our invention provides a sulfur trap with a combination of capacity and efficiency that is not achievable in other sulfur-removing technologies. Furthermore, the multiple bed approach has the added benefit of removing halocarbons.

SUMMARY OF THE INVENTION

The purpose of our invention is to remove sulfur-containing compounds and halocarbons such as fluorocarbons and chlorocarbons from gases to provide gas streams which typically contain these compounds at unprecedentedly low levels. An embodiment comprises an adsorption train of four beds. The first bed serves to remove water, which is necessary in order that the subsequent three beds act efficiently and effectively. The second bed is one having a strong affinity for sulfur-containing compounds generally, whereas the third adsorbent bed is one having a strong affinity for sulfur-containing compounds with a sulfur-oxygen double bond, a sulfur-carbon double bond, or sulfur-carbon single bond functionalities. The fourth adsorbent bed is alumina, which serves as a polishing bed to remove sulfur-containing compounds and halocarbons such as chlorocarbons and fluorocarbons to very low levels. In one embodiment, the first bed contains either zeolite X or zeolite A. In another embodiment the second bed contains a silver-exchanged molecular sieve. In yet another embodiment the third bed contains silicalite as the adsorbent. Other embodiments will be clear from the ensuing description.

BRIEF DESCRIPTION OF THE DRAWING

The FIGURE is a representation of the gas purification apparatus of the invention, including the vessel having an inlet and outlet and containing four sequential adsorbent beds.

DESCRIPTION OF THE INVENTION

The invention is a method of purifying gas streams to afford gases containing unusually low levels of chlorocarbons, fluorocarbons, and sulfur-containing compounds. We have found that a particular sequence of selected molecular sieve adsorbents provides an efficient method for removing the aforementioned contaminants in an economical fashion and in an effective manner.

Although any gas stream is suitable in the practice of our invention, gas streams of nitrogen, argon, helium, carbon dioxide, air, natural gas, methane, hydrogen, and oxygen are particularly common gas streams where our invention may be employed. The common contaminants whose removal is the subject of our invention are halocarbons such as fluorocarbons and chlorocarbons, which are commonly employed as lubricants and which find their way into gas streams at trace levels, as well as sulfur compounds. Among the chlorocarbons and fluorocarbons are fluorolubricants of the chlorotrifluoroethylene family, including their polymers, and those of the perfluoropolyether family as well as their polymers. Such compounds are exemplified by commercial products such as Halovac™, Krytox™, and Fomblin™. Sulfur-containing compounds include compounds such as hydrogen sulfide, sulfur dioxide, carbon disulfide, carbon oxysulfide (COS), and mercaptans such as methylmercaptans, methylmercaptans, etc., as well as thioethers, such as dimethylsulfide, diethylsulfide, methylethylsulfide, and so on.

Although moisture is not considered as a "contaminant" in the gas streams of this invention, nonetheless water in the gas stream must be removed to low levels to aid in the success of our invention. Water should be removed to levels no more than about 25 ppm, preferably to levels less than 10 ppm, and most desirably to levels of 1 ppm or less. In a typical gas stream which is purified by the process of our invention, fluorocarbons and chlorocarbons may be present at levels of 50 ppb or greater, and total sulfur-containing compounds may be present at levels of 10 ppm or greater. It will be recognized that a wide variation in levels of fluorocarbons, chlorocarbons, and sulfur-containing compounds in the gas streams to be purified is to be expected. Using the sequence of adsorbent beds as described within, it is quite feasible to remove chlorocarbons and fluorocarbons to levels of under 100 parts per trillion (ppt), with removal to levels of 50 ppt generally attainable, and removal to levels of under 5 ppt feasible. For sulfur-containing compounds, the purified gas stream typically contains less than 1,000 ppt of sulfur-containing compounds, usually under 100 ppt, with removal to under 10 ppt sulfur-containing compounds quite attainable.

The gas stream containing the contaminants described above is passed through a sequence of adsorbent beds. The first bed removes moisture from the gas stream to levels on the order of at least about 25 ppm, preferably to less than about 10 ppm, and most preferably to no more than about 1 ppm, and also removes any heavy hydrocarbons which may be present in the gas stream. The term "heavy hydrocarbons" refers to aromatic hydrocarbons of at least 6 carbon atoms, and aliphatic hydrocarbons of 4 carbon atoms or more. As mentioned above, the moisture is removed in order to optimize the capacity of subsequent adsorbent beds 2 and 3. Bed 1 may contain any molecular sieve having a strong affinity for water without a strong affinity for the gas being purified. Examples of suitable molecular sieve adsorbents include those having the structure of FAU and LTA as designated by the Structure Commission of the International Zeolite Association. The molecular sieves which are most favored in the practice of our invention are zeolite X and zeolite A. It is contemplated that zeolites 3A, 4A, and 5A are also suitable adsorbents for use in the first bed to adsorb water.

The second bed contains an adsorbent having a strong affinity for sulfur compounds generally, with a capability of affording gas streams containing under 1,000 ppt of sulfur-containing compounds when the initial gas stream contains 10 ppm of sulfur-containing compounds. This bed is particularly effective for removal of hydrogen sulfide and mercaptans and is also effective for removal of both fluorocarbons and chlorocarbons. Silver-exchanged molecular sieves such as those having a FAU structure as designated by the Structure Commission of the International Zeolite Association are especially suitable for use as the second bed, and silver-exchanged zeolite X is favored in the practice of our invention. The molecular sieve having the FAU structure may be silver exchanged to the extent of from about 5 to about 90%. That is, from about 5 up to about 90 percent of the available sites in the molecular sieve having the FAU structure are exchanged with silver corresponds to the compound having 0.1–3 weight percent silver.

The third bed contains an adsorbent capable of adsorbing sulfur-containing compounds with C=S, S=O, and C—S—C functionalities. We have found that molecular sieves with an MFI structure as designated by the Structure Commission of the International Zeolite Association and with a Si:Al ratio of at least 10 (i.e., silica:alumina is at least 20) and preferably greater than about 20, either alone or in combination with other molecular sieves, are effective when serving as the third bed in the process of our invention. The preferred adsorbents include ZSM-5 and silicalite. It is also contemplated that the adsorbent may be ZSM-12 or ZSM-23.

The fourth bed in the process of our invention is alumina. Alumina acts as a final polishing bed with relatively low capacity but with high efficiency in removing halocarbons such as chlorocarbons and fluorocarbons, and sulfur-containing contaminants into the parts per trillion range. Alumina also is quite effective in removing residual polar compounds from gas streams to levels under 1 ppm. Due to the low capacity of alumina, it is preferred that the alumina bed be the last adsorbent bed in the sequence of four beds.

The particle size and bed depth of the adsorbents used in the practice of our invention will depend on the flow rate of the gas stream being purified, with the particle size and bed depths being selected in order to minimize back pressure. For example, at a flow rate of 1–100 liters per minute, adsorbent particles may have a sphere size in the standard sieve mesh range of 8–12, which is equivalent to particles of diameters of 1.7–2.4 mm. At lower flows, smaller particle sizes may be effectively used, and conversely, at high flows a larger particle size may be employed.

We have found that the preferred amounts of adsorbents in beds 1, 2, 3, and 4 are in the ratio of approximately 1:2:2:1. However, although the foregoing ratio may represent an optimum, our invention is operable with a wide range of ratios of adsorbents in beds 1–4. It also is to be understood that the optimum ratio is dependent upon (1) the amount and nature of contaminants present in the initial gas stream, (2) the amount of moisture which may be present in the gas stream, (3) the flowrate of the gas stream, (4) the selectivity of the adsorbents, and (5) the capacity of the adsorbents. Furthermore, the order of the second and third beds may be reversed.

The invention is carried out in a relatively uncomplicated way, merely by passing a stream of gas through the four beds of adsorbent. The resultant purified gas stream is depleted in impurities such as water, sulfur-containing compounds, and halocarbons. That is, the concentration of impurities in the resultant purified gas stream is less than in that of the gas stream before being purified by the present invention.

Turning to the FIGURE, the apparatus of the invention is shown as a vessel 2 having a gas fluid inlet 4 and a gas fluid outlet 6. The vessel may be constructed of any suitable compound able to conduct the gas flow at the flow rate and pressure of the particular application. The gas fluid inlet and outlet may further be equipped with connectors so that the apparatus may be readily placed in a flowing gas stream. Furthermore, the gas fluid inlet and outlet may contain a retainer to prevent the solid contents of the vessel from being removed from the vessel. A first bed, 8, contains a molecular sieve having a strong affinity for water which can be one or more of zeolites X, Y, 3A, 4A, and 5A. A second bed, 10, contains molecular sieves having a strong affinity for sulfur-containing compounds such as silver exchanged molecular sieves having the FAU structure. A third bed, 12, contains an adsorbent having a strong affinity for sulfur compounds containing S=C, S=O, and S—C functionalities such as MFI molecular sieves with a Si:Al ratio of at least 10 or ZSM-12 and ZSM-23. The fourth bed, 14, contains at least alumina, which is an adsorbent having a high adsorption capacity for sulfur-containing compounds and halocarbons. It is contemplated that beds two and three may be reversed in their order, i.e., the gas stream would encounter the adsorbent of bed three before encountering the adsorbent of bed two.

What is claimed is:

1. A process for removing contaminants from a gas stream comprising passing said gas stream through sequential beds of adsorbents, where:

a) a first adsorbent bed of said sequential beds of adsorbents comprises one or more adsorbents having a strong affinity for water so as to remove water from the gas stream;

b) a second adsorbent bed of said sequential beds of adsorbents comprises one or more silver-exchanged molecular sieves having a FAU structure and having a strong affinity for sulfur-containing compounds generally to selectively remove sulfur-containing compounds from the gas stream;

c) a third adsorbent bed of said sequential beds of adsorbents comprises one or more molecular sieves having a strong affinity for sulfur compounds containing S=C, S=O, and S—C functionalities selected from the group consisting of molecular sieves having an MFI structure with a Si:Al ratio of at least 10, ZSM-12, and ZSM-23; and d) a fourth adsorbent bed of said sequential beds of adsorbents comprises alumina with adsorption capacity for sulfur-containing compounds and halocarbons.

2. The process of claim 1 wherein said one or more adsorbents of the first adsorbent bed are selected from the group consisting of molecular sieves having a FAU structure and molecular sieves having a LTA structures.

3. The process of claim 1 wherein said one or more adsorbents of the first adsorbent bed are selected from the group consisting of zeolite X and zeolite A.

4. The process of claim 1 wherein the silver-exchanged molecular sieve having the FAU structure comprises silver-exchanged zeolite X.

5. The process of claim 1 wherein said one or more molecular sieves having a strong affinity for sulfur compounds containing S=C, S=O, and S—C functionalities of the third adsorbent bed are selected from the group consisting of silicalite and ZSM-5.

6. The process of claim 1 wherein the weight ratio of the first, second, third, and fourth adsorbent beds is 1:2:2:1.

7. The process of claim 1 wherein the gas stream is selected from the group consisting of nitrogen, argon, helium, carbon dioxide, air, natural gas, methane, hydrogen, and oxygen.

8. A process for removing contaminants from a gas stream comprising passing said gas stream through sequential beds of adsorbents, where:

a) a first adsorbent bed of said sequential beds of adsorbents comprises one or more adsorbents having a strong affinity for water so as to remove water from the gas stream;

b) a second adsorbent bed of said sequential beds of adsorbents comprises one or more molecular sieves having a strong affinity for sulfur compounds containing S=C, S=O, and S—C functionalities selected from the group consisting of molecular sieves having a MFI structure with a SI:Al ratio of at least 10, ZSM-12, and ZSM-23;

c) a third adsorbent bed of said sequential beds of adsorbents comprises one or more silver-exchanged molecular sieves having the FAU structure and having a strong affinity for sulfur-containing compounds generally to selectively remove sulfur-containing compounds from the gas stream; and d) a fourth adsorbent bed of said sequential beds of adsorbents comprises alumina with adsorption capacity for sulfur-containing compounds and halocarbons.

9. The process of claim 8 wherein said one or more adsorbents of the first adsorbent bed are selected from the group consisting of molecular sieves having a FAU structure and molecular sieves having a LTA structures.

10. The process of claim 8 wherein said one or more adsorbents of the first adsorbent bed are selected from the group consisting of zeolite X and zeolite A.

11. The process of claim 8 wherein the silver-exchanged molecular sieve having the FAU structure comprises silver exchanged zeolite X.

12. The process of claim 8 wherein said one or more molecular sieves having a strong affinity for sulfur compounds containing S=C, S=O, and S—C functionalities of the second adsorbent bed are selected from the group consisting of silicalite and ZSM-5.

13. The process of claim 8 wherein the weight ratio of the first, second, third, and fourth adsorbent beds is 1:2:2:1.

14. The process of claim 8 wherein the gas stream is selected from the group consisting of nitrogen, argon, helium, carbon dioxide, air, natural gas, methane, hydrogen, and oxygen.

15. A gas purification apparatus comprising a vessel having a fluid gas inlet and a fluid gas outlet, said vessel containing a first, a second, a third, and a fourth sequential adsorbent bed, the first bed comprising one or more adsorbents having a strong affinity for water, the second bed comprising at least one molecular sieve selected from the group consisting of silver exchanged molecular sieves having the FAU structure, the third bed comprising a molecular sieve selected from the group consisting of a molecular sieves having a MFI structure with a Si:Al ratio of at least 10, ZSM-12, and ZSM-23, and the fourth bed comprising alumina.

16. The apparatus of claim 15 wherein the weight ratio of the first, second, third, and fourth adsorbent beds is 1:2:2:1.

17. The apparatus of claim 15 wherein said one or more adsorbents of the first bed are selected from the group consisting of molecular sieves having a FAU structure and molecular sieves having a LTA structures.

18. The apparatus of claim 15 wherein said one or more adsorbents of the first bed are selected from the group consisting of zeolite X and zeolite A.

19. The apparatus of claim 15 wherein the second adsorbent bed comprises silver exchanged zeolite X.

20. The apparatus of claim 15 wherein said molecular sieve of the third adsorbent bed is selected from the group consisting of silicalite and ZSM-5.

21. The apparatus of claim 15 wherein the adsorbent beds are located sequentially within the vessel so that the first adsorbent bed is adjacent the fluid gas inlet, the second adsorbent bed is adjacent the first adsorbent bed and between the first and third adsorbent beds, the third adsorbent bed is adjacent the second adsorbent bed and between the second and fourth adsorbent beds, and the fourth adsorbent bed is adjacent the fluid gas outlet.

22. The apparatus of claim 15 wherein the adsorbent beds are located sequentially within the vessel so that the first adsorbent bed is adjacent the fluid gas inlet, the third bed is adjacent the first bed and between the first and second beds, the second bed is adjacent the third adsorbent bed and between the third and fourth beds, and the fourth bed is adjacent the fluid gas outlet.

* * * * *